United States Patent [19]

Spall

[11] 4,235,092
[45] Nov. 25, 1980

[54] LOW FRICTION BEARING RUNNING TORQUE MEASURING APPARATUS

[75] Inventor: James M. Spall, Plymouth, Mich.

[73] Assignee: Burroughs Corporation, Detroit, Mich.

[21] Appl. No.: 46,945

[22] Filed: Jun. 8, 1979

[51] Int. Cl.³ .......................................... G01M 13/04
[52] U.S. Cl. ................................................... 73/9
[58] Field of Search ............................................ 73/9

[56] References Cited

U.S. PATENT DOCUMENTS

| 2,398,156 | 4/1946 | Puterbaugh et al. | 73/9 |
| 2,887,875 | 5/1959 | Curriston | 73/9 |
| 3,552,198 | 1/1971 | Friedland | 73/9 |

Primary Examiner—S. Clement Swisher
Attorney, Agent, or Firm—Charles P. Sammut; Charles E. Quarton; Kevin R. Peterson

[57] ABSTRACT

An apparatus provides a measurement of the running torque of a bearing under a radial load, by utilizing a balanced radial load on the bearing and a pendulum weight. The steady state running torque of the bearing is proportional to the sine of the deflection angle of the pendulum weight.

5 Claims, 3 Drawing Figures

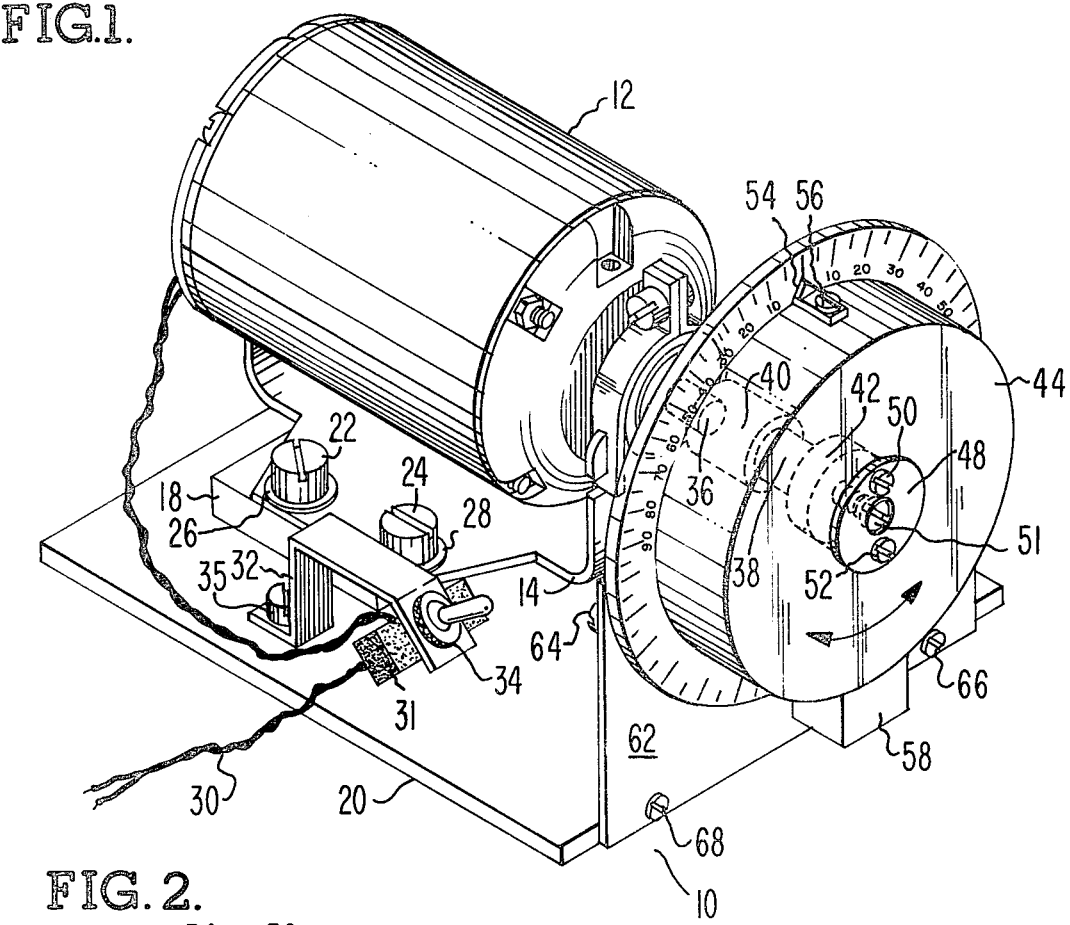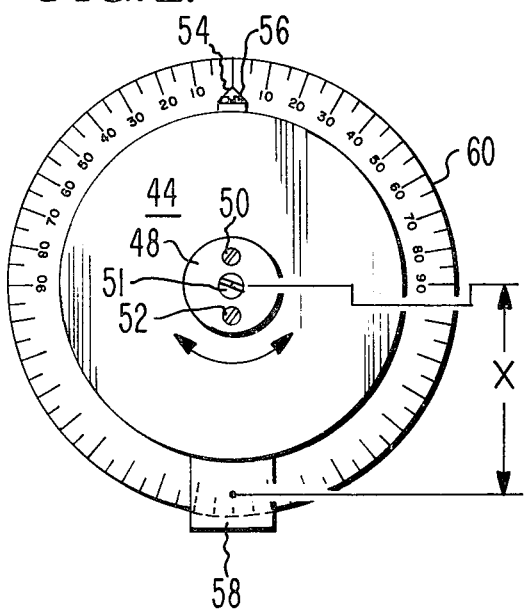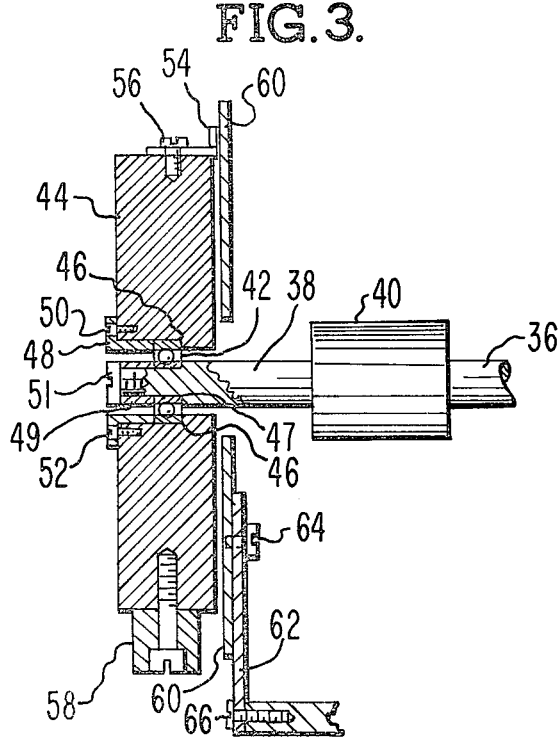

LOW FRICTION BEARING RUNNING TORQUE MEASURING APPARATUS

CROSS-REFERENCE TO RELATED APPLICATION

This application is related to the application entitled "LOW FRICTION BEARING STARTING TORQUE MEASURING DEVICE" filed by James Michael Spall on June 8, 1978 Ser. No. 046,946.

BACKGROUND OF THE INVENTION

1. Field of the Invention

This invention relates generally to a torque measuring apparatus and in particular to an apparatus which measures the running torque of a low-friction bearing when the bearing is running at a known speed and radial load.

2. Description of the Prior Art

In many applications low-friction bearings are typically loaded in a radial direction. Thus, in designing equipment which utilizes such low friction bearings it is desirable to have a measure of the running torque (also known as drag torque) of the bearing while the bearing is running at a known speed and radial load. The difficulty, however, in obtaining this type of measurement lies in designing a device which will be heavy enough to apply the required radial load yet be sufficiently sensitive to accurately measure the running torque in a low-friction bearing. Bearing manufacturers avoid this problem by applying an axial load to the test bearing. A typical bearing tester is disclosed by Wadsworth in U.S. Pat. No. 2,928,275. The tester disclosed by Wadsworth applies an axial load to a test bearing and measures the running torque indirectly through elapsed time. Other bearing testers which do apply a radial load to the test bearing also include an extraneous torque in each measurement. Accordingly, it is desireable to provide an apparatus for measuring the running torque of a bearing while the bearing is under an essentially radial load.

SUMMARY OF THE INVENTION

The object of the invention is to provide an apparatus for measuring the running torque of a bearing while the bearing is running at a known speed and radial load. The preferred embodiment of the invention utilizes an electric motor which drives a spindle. The spindle fits the inside diameter of a test bearing and drives the inside diameter at a desired speed. A radial load weight which is balanced about the axis of the bearing fits the outside of the test bearing. Attached to the periphery of the radial load weight is a pendulum weight which provides a restoring torque as it is raised. A protractor indicator which consists of a pointer and a scale permits measurement of the angle to which the radial load weight deflects thereby giving an indication of the running torque at the desired speed. The invention has the advantage of applying only a radial load to the test bearing. A further feature of the invention is that it measures the running torque of only the test bearing, without the need for deducting the value of torque due to the test device. Yet another feature of the invention is that it is extremely simple and inexpensive when compared to currently available bearing testers.

BRIEF DESCRIPTION OF THE DRAWING

FIG. 1 is a front three-quarter view of the preferred embodiment of the invention;

FIG. 2 is a front view of the radial load weight, pendulum, pointer and scale; and FIG. 3 is a sectional view of the spindle, radial load weight, test bearing, pendulum weight, pointer and scale.

DESCRIPTION OF THE PREFERRED EMBODIMENT OF THE INVENTION

Referring to the drawing, in FIG. 1 a running torque measuring apparatus is shown generally at 10. An electric motor 12 is secured by a support bracket 14. The support bracket 14 and a spacer 18 are secured to a base plate 20 by a pair of screws 22 and 24 and a pair of washers 26 and 28. A second pair of screws and washers are utilized on the opposite side of the bracket 14 but are not shown in FIG. 1.

The electric motor 12 is powered by an external power supply through the line cord 30. A switch 31 selectively connects or disconnects the line cord 30 to the electric motor 12. The switch 31 is secured to a bracket 32 by a round nut 34. The bracket 32 is secured to the base plate 20 by a screw 35.

Referring to FIGS. 1, 2, and 3, an armature shaft 36 of the motor 12 is coupled to a driven spindle 38 by a coupler 40. The driven spindle 38 fits the inner race of a test bearing 42. The outer race of the test bearing 42 is positioned within a radial load weight 44 between a shoulder 46 and one end of a sleeve 48. The sleeve is secured to the radial load weight 44 by a pair of screws 50 and 52. The depth of the sleeve 48 is such that the outer race of the test bearing 42 is firmly held against the shoulder 46.

The driven spindle 38 has two separate diameters which form a shoulder 47. The inner race of the testing bearing 42 is secured between the shoulder 47 and a retaining sleeve 49. A screw 51 insures that the inner race of the test bearing 42 secured between the shoulder 47 and the retaining sleeve 49.

A pointer 54 is attached to the radial load weight 44 by a screw 56. The pendulum weight 58 is attached to the radial load weight 44 180° away from the pointer 54. A protractor plate 60 is positioned adjacent to the pointer 54 in order to provide a readable measure of the angular deflection of the radial load weight 48. The protractor plate 60 is secured to a support plate 62 by a screw 64. The support plate 62 is secured to the base plate 20 by a pair of screws 66 and 68.

In operation the electric motor 12 drives the driven spindle 38 through the coupler 40. As the driven spindle 38 rotates, the test bearing 42 exerts a torque on the radial load weight 44 and on the pendulum weight 58. Since the radial load weight 48 is balanced, it exerts no restoring torque, but only an inertia which becomes zero for steady state measurements. The penedulum weight 58 exerts a restoring force which is proportional to its horizontal displacement from the vertical plane of the driven spindle 48. Specifically, the restoring torque is proportional to the sine of the deflection angle, as measured on the protractor plate 60. Therefore when a steady-state condition is reached, the inertial effect of the radial load weight 48 is zero and the restoring torque exerted by the pendulum weight 58 is equal to the running torque of the test bearing 42.

For a test bearing 42 running under a known radial load weight at a known velocity, the running torque is calculated as follows:

$$\text{running torque} = mx \sin \theta$$

where
- m = mass of pendulum weight
- x = distance from center of driven spindle to center of gravity of the pendulum weight.
- $\theta$ = angle of deflection of the pendulum weight.

The invention has been described with reference to a specific embodiment and it is to be understood that although this embodiment represents the best mode of practicing the invention known to the inventor at the time of filing the patent application, various modifications and additions to the illustrated embodiment are possible and accordingly the foregoing description is not to be construed in a limiting sense.

I claim:

1. An apparatus for applying a radial load to a bearing and measuring the steady state running torque of the bearing comprising:
    a bearing having an inner race and an outer race;
    radial load means for applying a uniform radial load to the outer race of the bearing;
    drive means for rotating the inner race of the bearing at a steady speed;
    pendulum weight means for exerting a restoring force on the radial load means; and
    means for indicating the angular displacement of the radial load means.

2. The apparatus of claim 1 wherein the radial load means further comprises:
    a cylinder having a first bore and a second bore, said bores being concentric with one another and the diameter of the first bore being less than the diameter of the second bore, and
    a sleeve extending within the second bore, for securing the bearing against a shoulder formed by the junction of the first bore and the second bore.

3. The apparatus of claim 1 wherein the drive means further comprises:
    an electric motor,
    a driven spindle concentric with and in contact with the inner race of the bearing, for driving the inner race of the bearing, and
    means for coupling the electric motor with the driven spindle.

4. The apparatus of claim 1 wherein the indicating means further comprises:
    a pointer secured to a location on the radial load means 180° from the pendulum weight means; and
    scale means for indicating the relative position of the pointer.

5. A method of applying a radial load to a bearing and measuring the steady state running torque of the bearing, comprising:
    applying a known uniform radial load to an outer race of the bearing;
    rotating an inner race of the bearing at a known speed thereby generating a running torque on the outer race of the bearing;
    applying a restoring force to the uniform radial load to restrain rotation thereof by the running torque applied to the outer race of the bearing;
    and indicating the angular displacement of the radial load.

* * * * *